US009816560B2

(12) United States Patent
Nakai

(10) Patent No.: US 9,816,560 B2
(45) Date of Patent: Nov. 14, 2017

(54) SEAL RING-EQUIPPED BALL BEARING

(71) Applicant: NSK Ltd., Shinagawa-ku, Tokyo (JP)

(72) Inventor: Kimiko Nakai, Fujisawa (JP)

(73) Assignee: NSK Ltd., Tokyo (JP)

( * ) Notice: Subject to any disclaimer, the term of this patent is extended or adjusted under 35 U.S.C. 154(b) by 2 days.

(21) Appl. No.: 14/904,091

(22) PCT Filed: Jul. 7, 2014

(86) PCT No.: PCT/JP2014/068083
§ 371 (c)(1),
(2) Date: Jan. 9, 2016

(87) PCT Pub. No.: WO2015/005289
PCT Pub. Date: Jan. 15, 2015

(65) Prior Publication Data
US 2016/0153497 A1 Jun. 2, 2016

(30) Foreign Application Priority Data

Jul. 9, 2013 (JP) .................................. 2013-143444
Jun. 24, 2014 (JP) .................................. 2014-129533

(51) Int. Cl.
*F16C 33/76* (2006.01)
*F16C 33/78* (2006.01)
(Continued)

(52) U.S. Cl.
CPC .......... *F16C 33/7823* (2013.01); *F16C 19/06* (2013.01); *F16C 33/427* (2013.01);
(Continued)

(58) Field of Classification Search
CPC .......................... F16C 33/782; F16C 33/7823;
F16C 33/7853; F16C 33/7856; F16C 33/7876;
(Continued)

(56) References Cited

U.S. PATENT DOCUMENTS 3,994,545 A   11/1976   Van Dorn
4,733,978 A * 3/1988   Colanzi ............... F16C 33/7853
                                                       277/375

(Continued)

FOREIGN PATENT DOCUMENTS

DE  102010008947 A1   8/2011
EP   1 286 074 A1     2/2003
(Continued)

OTHER PUBLICATIONS

International Search Report from International Patent Application No. PCT/JP2014/068083, dated Sep. 16, 2014.
(Continued)

*Primary Examiner* — James Pilkington
(74) *Attorney, Agent, or Firm* — Shapiro, Gabor and Rosenberger, PLLC

(57) ABSTRACT

The present invention achieves construction for a seal ring-equipped ball bearing (1a) that allows the outer-diameter dimension of a load-bearing surface (35a) to be made large, allows a large contact area with a transmission gear (16) to be secured, and allows dynamic torque to be reduced. Seal lips (14a) of seal rings (4a) that cover opening sections on both sides of the seal ring-equipped ball bearing (1a) have a substantially horizontal V-shaped cross-section and are configured so that an outer-diameter-side inclined section (25) and an inner-diameter-side inclined section (26) are connected by a continuous portion (27). The inner-circumferential edge section of the inner-diameter-side inclined section (26), which is the tip-end edge of the seal lip (14a), is made to slide over the entire circumference of the outer peripheral surfaces of both end sections of an inner ring (8a), the end sections being cylindrical surfaces (30) without seal grooves. The angle ($\alpha_1$) of an inside-continuous surface (29) of the continuous portion (27) is at least 104°, and the overall length of the inner-diameter-side inclined section (Continued)

(26) is kept long by the continuous portion (27) entering radially inward into a wave-shaped retainer (10a).

6 Claims, 10 Drawing Sheets

(51) Int. Cl.
    *F16C 19/06*         (2006.01)
    *F16J 15/3204*      (2016.01)
    *F16J 15/3252*      (2016.01)
    *F16C 33/42*         (2006.01)
    *F16J 15/3232*      (2016.01)
    *F16H 57/021*      (2012.01)

(52) U.S. Cl.
    CPC ....... *F16C 33/7856* (2013.01); *F16J 15/3204* (2013.01); *F16J 15/3232* (2013.01); *F16J 15/3252* (2013.01); *F16C 2240/40* (2013.01); *F16C 2361/65* (2013.01); *F16H 57/021* (2013.01)

(58) Field of Classification Search
    CPC .. F16J 15/3204; F16J 15/3224; F16J 15/3232; F16J 15/3252; F16H 15/3204; F16H 15/3224; F16H 15/3232; F16H 15/3252
    USPC ........................................................ 277/560
    See application file for complete search history.

(56) References Cited

U.S. PATENT DOCUMENTS

| | | | | |
|---|---|---|---|---|
| 5,470,158 A | * | 11/1995 | McLarty | F16C 33/7856 |
| | | | | 277/397 |
| 8,714,827 B2 | * | 5/2014 | Ishikawa | F16C 33/3887 |
| | | | | 384/480 |
| 9,115,762 B2 | * | 8/2015 | Sasaki | F16C 33/7856 |

FOREIGN PATENT DOCUMENTS

| | | |
|---|---|---|
| JP | 06-082437 U | 11/1994 |
| JP | 08-296658 A | 11/1996 |
| JP | 2001-140907 A | 5/2001 |
| JP | 2002-115724 A | 4/2002 |
| JP | 2011-080497 A | 4/2011 |
| JP | 2011-080527 A | 4/2011 |
| JP | 2011-117548 A | 6/2011 |
| JP | 2013-036493 A | 2/2013 |
| WO | WO 2013/002115 A1 | 1/2013 |

OTHER PUBLICATIONS

Extended European Search Report dated Jun. 23, 2017, in European Patent Application No. EP14822586.5.

* cited by examiner

SEAL RING-EQUIPPED BALL BEARING

TECHNICAL FIELD

The present invention relates to a seal ring-equipped ball bearing of a rotation support section of an automobile transmission.

BACKGROUND ART

As illustrated in FIG. 13, a seal ring-equipped ball bearing 1 is used in a rotation support section of an automobile transmission that supports a rotating shaft inside a casing (not illustrated in the figure) so as to rotate freely (refer to JP2011080497 (A), JP2011080527 (A), JP2002115724 (A), JP2001140907 (A)). In the seal ring-equipped ball bearing 1, a contact-type seal ring is equipped in order to prevent damage to raceway surfaces of the bearing rings or to the rolling surfaces of the rolling bodies due to metal abrasion powder that is generated in the engagement section of the transmission gears or the like and that gets into the rolling contact areas of the ball bearing 1.

More specifically, the seal ring-equipped ball bearing 1 includes a ball bearing 3 and a pair of seal rings 4. The ball bearing 3 includes: an outer ring 6 that has a deep-groove outer-ring raceway 5 around the middle section in the axial direction of the inner-circumferential surface thereof, and that is fastened inside the casing so as not to rotate even during use; an inner ring 8 that has a deep-groove inner-ring raceway 7 around the middle section in the axial direction of the outer-circumferential surface thereof, and that is fastened around the outside of a rotating shaft 2 so as to rotate together with the rotating shaft 2 during use; plural balls 9 as rolling bodies that are provided between the outer-ring raceway 5 and the inner-ring raceway 7 so as to roll freely; and a retainer 10 that holds the balls 9 so as to roll freely.

The pair of seal rings 4 are located between the inner-circumferential surfaces on both end sections in the axial direction of the outer ring 6 and the outer-circumferential surfaces of both end sections in the axial direction of the inner ring 8, and cover the openings on both ends in the axial direction of the ring-shaped internal spaces where the balls 9 are located that exist between the inner-circumferential surface of the outer ring 6 and the outer-circumferential surface of the inner ring. These seal rings 4 are configured so that an elastic member 12 that has a circular annular shape as a whole and that is made of an elastomer such as rubber is reinforced by a circular annular-shaped metal insert 11 that is made of metal plate such as steel plate. The outer-circumferential edge section of each elastic member 12 protrudes outward in the radial direction (up-down direction in FIG. 13) a little more than the outer-circumferential edge of the metal insert 11, and the protruding portions are locked into locking grooves 13 that are formed around the inner-circumferential surfaces of both end sections in the axial direction of the outer ring 6. On the other hand, the inner-circumferential edge section of each elastic member 12 sufficiently protrudes inward in the radial direction more than the inner-circumferential edge of the metal insert 11, and this protruding portion forms a seal lip 14. The tip end sections of the seal lips 14 penetrate inside seal grooves 15 that are formed around the outer-circumferential surfaces on both end sections in the axial direction of the inner ring 8, and the side surfaces of the tip end sections of the seal lips 14 come in sliding contact with the side surfaces in the axial direction of the seal grooves 15 to form sliding contact areas between the seal lips 14 and the seal grooves 15.

In the construction illustrated in FIG. 13, a transmission gear 16 having a toothed section (for example, helical gear) around the outer-circumferential surface thereof and that is formed around the middle section in the axial direction of the rotating shaft 2 is supported by a radial needle bearing 17 so that relative rotation is possible. An annular shaped spacer 18 is provided between the seal ring-equipped ball bearing 1 and the transmission gear 16. The surface on one end in the axial direction (left-end surface in FIG. 13) of a cylindrical shaped boss 19 that functions as the outer ring of the radial needle bearing 17 and that is provided in a portion near the inner diameter of the transmission gear 16 comes in contact by way of the spacer 18 with a flat load-bearing surface 35 that is provided on the surface on one end in the axial direction (right-end surface in FIG. 13) of the inner ring 8 of the seal ring-equipped ball bearing 1. With this kind of construction, by using the seal ring-equipped ball bearing 1, a gear reaction force that acts on the transmission gear 16 is supported, and the transmission gear 16 can be positioned in the axial direction. The outer-diameter dimension of the spacer 18 is about the same as the outer-diameter dimension of the boss 19, and is larger than the outer-diameter dimension $D_{35}$ of the load-bearing surface 35 of the inner ring 8.

In this conventional construction, concave-groove shaped seal grooves 15 that are open on the end surfaces in the axial direction are provided around the outer-circumferential surfaces on both end sections in the axial direction of the inner ring 8, so when compared with construction in which seal grooves are not provided, the outer-diameter dimension $D_{35}$ of the load-bearing surface 35 of the inner ring 8 becomes small. When the surface on one end in the axial direction of the boss 19 comes in direct contact with the load-bearing surface 35, the contact surface pressure on the contact surface between the load-bearing surface 35 and the boss 19 becomes high due to the contact surface area being small, and there is a possibility that the amount of wear will become large, so this is prevented by providing a spacer 18. However, providing the spacer 18 brings about different problems such as an increase in the number of parts and assembly work, and makes it more difficult to make the device more compact and lightweight. As illustrated in FIG. 14, it is feasible to eliminate the spacer by increasing the outer-diameter dimension of the inner ring 8 while keeping the outer-diameter dimension of the load-bearing surface 35 large, however, as the outer-diameter dimension of the outer ring 6 increases, the size of the seal ring-equipped ball bearing 1 increases.

On the other hand, instead of construction in which the tip-end edges of the seal lips are brought into sliding contact in the axial direction with the side surfaces in the axial direction of the seal grooves (seal-groove construction), it is possible to eliminate the seal grooves and to use construction in which the tip-end edges of the seal lips are brought into sliding contact in the radial direction with the outer-circumferential surface of the end sections in the axial direction of the inner ring (shaft-seal construction). However, in groove-seal construction, the tip end sections of the seal lips penetrate inside the seal grooves, so the design space (design area) for the seal lips in order to prevent interference with the retainer is kept large, and thus it is possible to improve the freedom of design when designing the seal rings, however, in shaft-seal construction, the design space for the seal lips becomes small, and thus the freedom of design when designing the seal rings is reduced. Moreover, in groove-seal construction, even when there is relative displacement in the radial direction between the outer ring and the inner ring, the areas of sliding contact move in the radial direction and the displacement can be absorbed, so it is possible to prevent the surface pressure (tension force) at the areas of sliding contact from increasing, however, in shaft-seal construction, it is necessary to absorb this kind of displacement through elastic deformation of the seal lips, so it becomes easy for the surface pressure at the areas of sliding contact to increase. Therefore, in shaft-seal construction, with an intention to keep the rotational resistance (dynamic torque) of the seal ring-equipped ball bearing low, it is difficult to keep the surface pressure at the areas of sliding contact low while maintaining the necessary seal characteristics.

RELATED LITERATURE

Patent Literature

[Patent Literature 1] JP2011080497 (A)
[Patent Literature 2] JP2011080527 (A)
[Patent Literature 3] JP2002115724 (A)
[Patent Literature 4] JP2001140907 (A)

SUMMARY OF INVENTION

Problem to be Solved by Invention

Taking the situation described above into consideration, it is the object of the present invention to achieve construction of a seal ring-equipped ball bearing for which dynamic torque can be reduced while at the same time the outer-diameter dimension of the load-bearing surface can be kept large, and the contact surface areas between the load-bearing surface and members that are adjacently located in the axial direction can be kept large.

Means for Solving Problems

The seal ring-equipped ball bearing of the present invention is used by being assembled in the rotation-support section of an automobile transmission. The seal ring-equipped ball bearing includes an inner ring, an outer ring, plural balls, a retainer, and a seal ring. The outer ring has an outer-ring raceway around the inner-circumferential surface, and does not rotate even during use. The inner ring has an inner-ring raceway around the outer-circumferential surface, and rotates during use. The balls are arranged between the outer-ring raceway and the inner-ring raceway so as to roll freely. The retainer is made of metal or synthetic resin, and holds the plural balls so as to roll freely. The seal ring is locked to the inner-circumferential surface on an end section in the axial direction of the outer ring, and covers an opening of an end section in the axial direction of the ring-shaped internal space that exists between the inner-circumferential surface of the outer ring and the outer-circumferential surface of the inner ring where the balls are located. A load-bearing surfaces is provided on an end surface in the axial direction of the inner ring of the seal ring-equipped ball bearing, and when assembled in the rotation-support section, a member that is arranged adjacent in the axial direction comes in contact with the load-bearing surface, and the load-bearing surface supports a load in the axial direction that acts from that member.

Particularly, in the case of the seal ring-equipped ball bearing of the present invention, the seal ring includes a metal insert and an elastic member. The metal insert is made of metal plate such as carbon steel and is formed into an annular shape. The elastic member is preferably made of hydrogenated nitrile rubber and is reinforced by the metal insert, and has a seal lip that is formed so as to elastically deform in at least the radial direction by protruding the entire inner-circumferential edge of the elastic member further inward in the radial direction than the metal insert. The seal lip includes: an outer-diameter-side inclined section that is inclined inward in the radial direction and in a direction toward the center side (internal space side) in the axial direction of the seal ring-equipped ball bearing going away from the inner-circumferential edge of the metal insert; and an inner-diameter-side inclined section that is inclined inward in the radial direction and in a direction toward the outside (external space side) in the axial direction of the seal ring-equipped ball bearing going away from the outer-diameter-side inclined section; and a continuous section that makes a small-diameter side end section of the outer-diameter-side inclined section and a large-diameter-side end section of the inner-diameter-side inclined section continuous.

A portion that is surrounded by the inner-circumferential surface of the outer-diameter-side inclined section, the outer-circumferential surface of the inner-diameter-side inclined section, and the axial side surface in the axial direction of the continuous section form a groove section that has a wedge-shape cross section and faces the external space side of the seal ring-equipped ball bearing. Moreover, the surface of the continuous section on the opposite side in the axial direction from the groove section is taken to be an inside-continuous surface that faces the internal space side of the seal ring-equipped ball bearing. The inner-circumferential edge section of the inner-diameter-side inclined section, which is the tip-end edge of the seal lip, comes in sliding contact in the radial direction around the entire outer-circumferential surface of the end section in the axial direction of the inner ring, which is a cylindrical surface having a straight generating line or a partial conical convex surface. And in the cross-sectional shape on a virtual plane that includes the center axis of the seal ring, the angle between the center axis and an extended line of the inside-continuous surface in the free state of the seal lip is 104° or greater.

Preferably, in the cross-sectional shape on the virtual plane, a bisector of the inside surfaces of the groove section and the center axis cross on the internal space side of the seal ring-equipped ball bearing. Moreover, the length dimension L of a fixed-thickness portion of the continuous section where the thickness dimension is fixed is regulated to be within the range of one to two times the thickness dimension H of that fixed-thickness portion.

The present invention is not limited to this, however, can be suitably applied when the member that is arranged adjacent in the axial direction is a transmission gear. Moreover, the present invention is not limited to this, however, particularly can be suitably applied to construction in which the retainer is a wave-shaped retainer that is formed by connecting and fastening together with rivets a pair of retaining elements that are obtained by bending annular shaped metal plates in a pressing process so as to have a wave shape in the circumferential direction, with the outside surfaces of the portions that correspond to the pockets that hold the balls being partial spherical convex surfaces.

Effect of Invention

With the seal ring-equipped ball bearing of the present invention that is constructed as described above, seal construction (shaft-seal construction) in which the inner-circumferential edge section of the inner-diameter-side inclined section, which is the tip-end edge of the seal lip, is brought into sliding contact with the outer-circumferential surface of the end sections in the axial direction of the inner ring is used, so it is possible to increase the outer-diameter dimension of the load-bearing surface, and thus together with being able to maintain a large contact surface area between the load-bearing surface and the member that is adjacently arranged in the axial direction, it is possible to reduce the dynamic torque. Therefore, it is possible to maintain a large outer-diameter dimension of the load-bearing surface without having the increase the size of the seal ring-equipped ball bearing, and it is possible to bring the load-bearing surface in direct contact with the end surface in the axial direction of the member that is adjacently arranged in the axial direction while maintaining a large contact surface area therebetween. As a result, it becomes possible to eliminate the spacer that was necessary in the conventional construction, and thus it is possible to reduce the number of parts of an automobile transmission and the number of assembly steps for assembling the automobile transmission, and it is possible to make the seal ring-equipped ball bearing more compact and lightweight.

Moreover, in the present invention, the cross-section shape of the seal lip is a substantially horizontal V shape, and the inclination angle of the inside continuous surface is regulated along the movement track (area) of the retainer due to whirling (the angle between the center axis of the seal ring and the extended line of the inside-continuous surface is 104° or greater, so it is possible for at least part of the continuous section of the seal lip to enter toward the inside in the radial direction of the retainer, and it is possible to keep the overall length of the inner-diameter-side inclined section of the seal lip long, keep the surface pressure at the area of sliding contact between the tip-end edge of the seal lip and the outer-circumferential surface of the end section in the axial direction of the inner ring low, and reduce the dynamic torque of the seal ring-equipped ball bearing.

MODES FOR CARRYING OUT INVENTION

First Example

Figure 1:
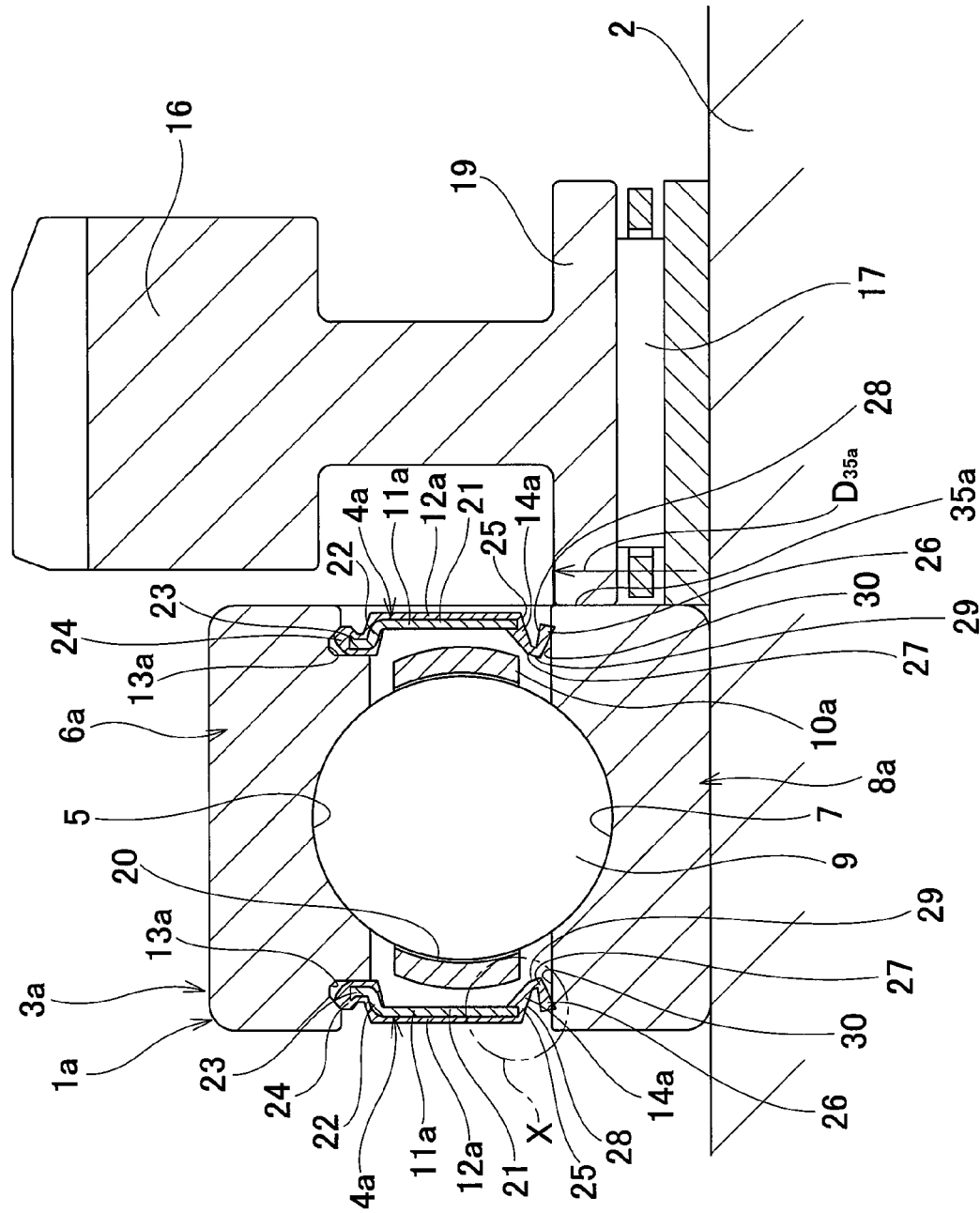
FIG. 1 is a partial cross-sectional view of a seal ring-equipped ball bearing of a first example of an embodiment of the present invention, and illustrates the assembled state in an automobile transmission.
Figure 2:
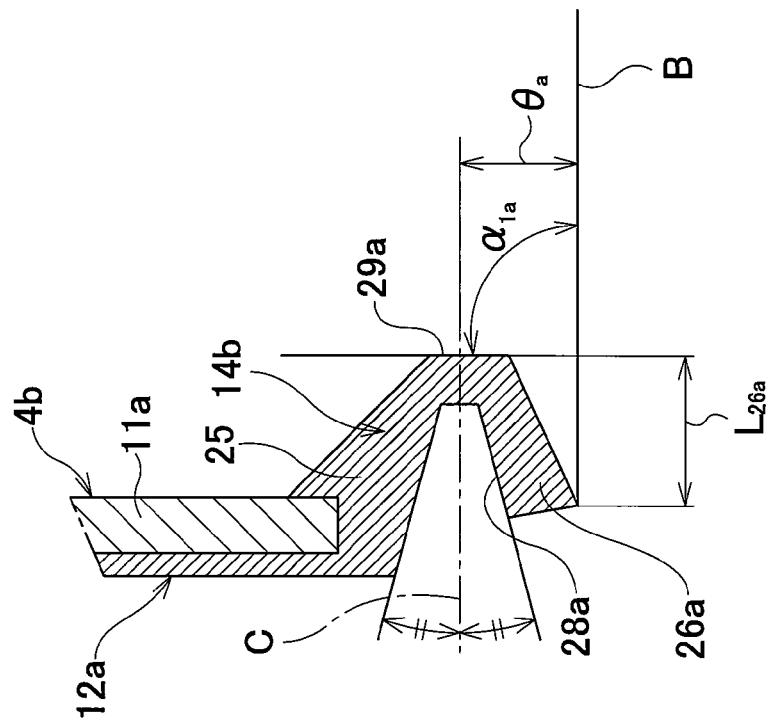
FIG. 2A is an enlarged cross-sectional view of the shape of a seal lip in part X in FIG. 1.
FIG. 2B is an enlarged cross-sectional view illustrating the shape of a seal lip in in a similar portion in reference construction.
Figure 2:
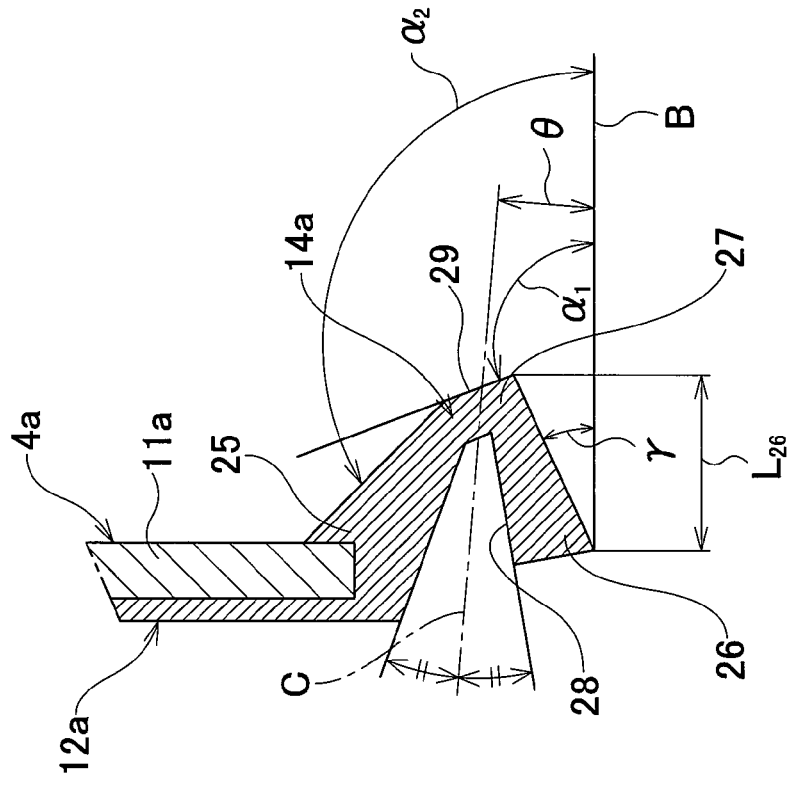

FIG. 1 to FIG. 5 illustrate a first example of an embodiment of the present invention. The seal ring-equipped ball bearing 1a of this example includes a ball bearing 3a and a pair of seal rings 4a. The ball bearing 3a includes an outer ring 6a, an inner ring 8a, plural balls 9, and a retainer 10a. The outer ring 6a has a deep-groove outer-ring raceway 5 around the middle section in the axial direction of the inner-circumferential surface, and is fastened to the inside of a casing (not illustrated in the figures) so as not to rotate during use. The inner ring 8a has a deep-groove inner-ring raceway 7 around the middle section in the axial direction of the outer-circumferential surface, and is fastened around the outside of the rotating shaft 2 so as to rotate together with the rotating shaft 2 during use. The plural balls 9 are arranged between the outer-ring raceway 5 and inner-ring raceway 7 so as to roll freely.

The retainer 10a is provided for holding the balls 9 so as to freely rotate, and in this example, a wave-shaped retainer (pressed retainer) that is formed by connecting and fastening together with rivets a pair of retaining elements that are obtained by bending annular shaped metal plates in a pressing process so as to have a wave shape in the circumferential direction is used. In the retainer 10a, the inside surfaces of pockets 20 that hold the balls 9 are partial spherical concave surfaces, and the outside surfaces of the sections that correspond to the pockets are partial spherical convex surfaces. In other words, the cross-sectional shape of the outside surface of the retainer 10a with respect to a virtual plane that includes the center axis of the seal ring-equipped ball bearing 1a and the center of the balls 9 is a partial circular arc shape, the middle in the radial direction of which protrudes in the axial direction further than both end sections.

Each seal ring 4a includes a metal insert 11a and an elastic member 12a. The metal insert 11a is made of metal plate such as steel plate and is formed into an annular shape, and includes a flat plate-shaped annular section 21 that extends in the radial direction, a cylindrical section 22 that is bent from the outer-circumferential edge of the annular section 21 and extends toward the center side in the axial direction of the seal ring-equipped ball bearing 1a, and a bent section 23 that is bent from the tip-end edge of the cylindrical section 22 and extends toward the outside in the radial direction.

The elastic member 12a is made of a rubber material such as hydrogenated nitrile rubber, acrylic rubber, acrylonitrile butadiene rubber (nitrile rubber) or the like, or some other elastomer, is reinforced by the metal insert 11a, and surrounds the metal insert 11a. Both the inner and outer circumferential edge sections of the elastic member 12a protrude further in the radial direction than both the inner and outer circumferential edges of the metal insert 11a. The protruding portion on the inner-circumferential edge section side of the elastic member 12a includes a seal lip 14a that has a substantially horizontal V shape cross-sectional shape that is open toward the outside in the axial direction of the seal ring-equipped ball bearing 1a. On the other hand, the protruding portion on the outer-circumferential edge section side of the elastic member 12a includes a ring-shaped locking section 24. The seal rings 4a covers the openings on both end sections in the axial direction of the ring-shaped internal space of where the balls 9 are located that exists between the inner-circumferential surface of the outer ring 6a and the outer-circumferential surface of the inner ring 8a with the ring-shaped locking sections 24 locked into locking grooves 13a that are formed around the inner-circumferential surfaces of both end sections in the axial direction of the outer ring 6a. This example, as will be described later, uses seal construction in which the tip-end edge of each seal lip 14a comes in sliding contact with the outer-circumferential surface of the end section in the axial direction of the inner ring 8a (shaft-seal construction), so the radial dimension of the seal lip 14a becomes small, and it becomes easy for creep to occur, so preferably hydrogenated nitrile rubber having high tensile strength is used as the elastic material of the seal lip 14a.

Each seal lip 14a has a substantially horizontal V-shaped cross-sectional shape and is constructed by connecting an outer-diameter-side inclined section 25 and an inner-diameter-side inclined section 26 with a continuous section 27. The outer-diameter-side inclined section 25 is inclined inward in the radial direction and in a direction toward the center side in the axial direction of the seal ring-equipped ball bearing going away from the inner-circumferential edge of the metal insert 11a (toward the tip-end edge). The inner-diameter-side inclined section 26 is inclined inward in the radial direction and in a direction toward the outside in the axial direction of the seal ring-equipped ball bearing going away from the outer-diameter-side inclined section 25 (toward the tip-end edge). The continuous section 27 connects the small-diameter-side end section of the outer-diameter-side inclined section 25 and the large-diameter-side end section of the inner-diameter-side inclined section 26. A portion that is surrounded on three sides by the inner-circumferential surface of the outer-diameter-side inclined section 25, the outer-circumferential surface of the inner-diameter-side inclined section 26, and the side surface in the axial direction (outside surface in the axial direction) of the continuous section 27 has a wedge-shaped cross-sectional shape, and forms a groove section 28 that faces the external-space side of the seal ring-equipped ball bearing 1. Of the continuous section 27, the surface on the opposite side in the axial direction from the groove section 28 is an inside-continuous surface 29 that faces the internal-space side of the seal ring-equipped ball bearing 1a. The cross-sectional shape of the inside-continuous surface 29 when the seal lip 14a is in the free state is essentially a straight shape except for minute deformation due to manufacturing error.

Figure 13:
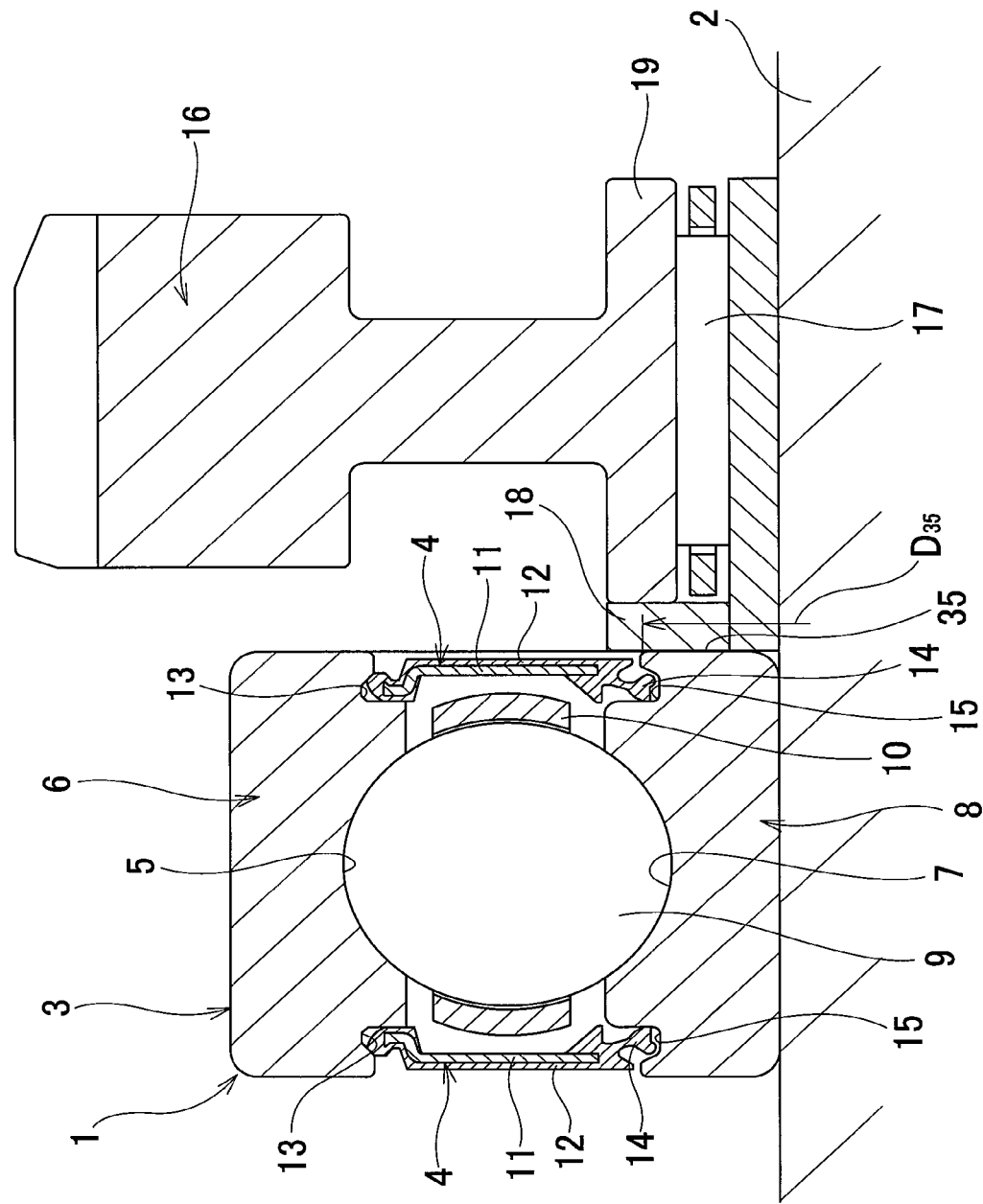
FIG. 13 is a partial cross-sectional view of a seal ring-equipped ball bearing of a first example of conventional construction, and illustrates the assembled state in an automobile transmission.
Figure 14:
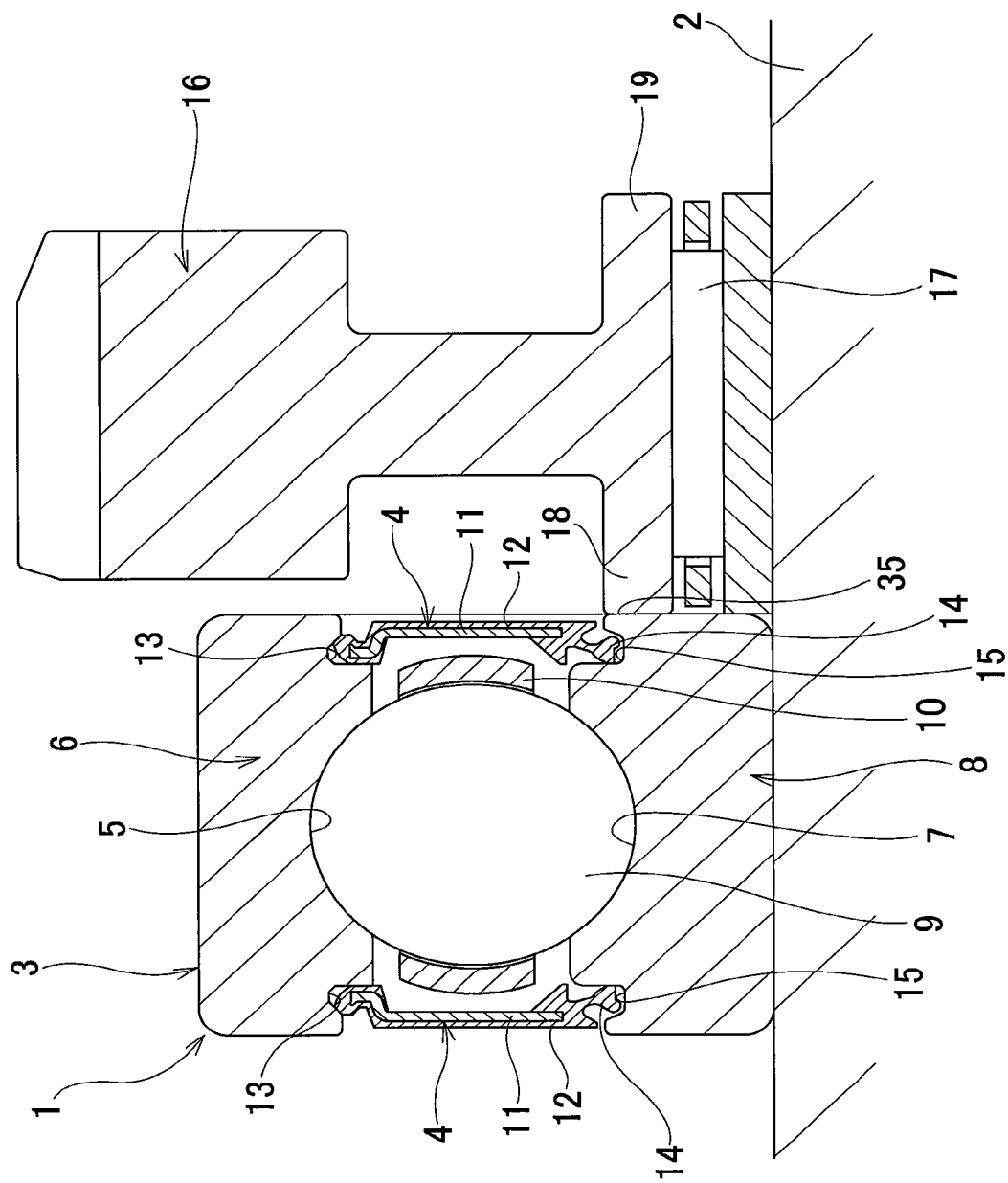
FIG. 14 is a view similar to FIG. 13, and illustrates a second example of conventional construction.

In this example, the inner-circumferential edge sections of the inner-diameter-side inclined sections 26, which are the tip-end edges of the seal lips 14a, come in sliding contact around the entire circumference with the outer-circumferential surface of both ends in the axial direction of the inner ring 8a. The outer-circumferential surfaces of both end sections in the axial direction of the inner ring 8a are cylindrical surfaces that have a straight generating line shape, and there is no seal groove 15 (see FIG. 13) provided on the outer-circumferential surfaces of both end sections in the axial direction of the inner ring 8a. Therefore, the outer-diameter dimension $D_{35a}$ of the flat (annular shape that exists on the virtual plane that orthogonally crosses the center axis of the seal ring-equipped ball bearing 1a) load-bearing surface 35a that is provided on one end surface in the axial direction (right-end surface in FIG. 1) of the inner ring 8a is larger than the outer-diameter dimension $D_{35}$ of the load-bearing surface 35 (see FIG. 13) of a conventional inner ring 8 by the amount of the seal groove that is not provided ($D_{35a} > D_{35}$).

In this example, a transmission gear 16 having a toothed section (for example, helical teeth) around the outer-circumferential surface thereof is supported by a portion around the middle section in the axial direction of the rotating shaft 2 that is adjacent in the axial direction to the seal ring-equipped ball bearing 1a by way of a radial needle bearing 17 so as to freely rotate relative to the rotating shaft 2. One end surface in the axial direction (left-end surface in FIG. 1) of the cylindrical shaped boss section 19 that is provided in a portion near the inner diameter of the transmission gear 16 comes in direct contact with the load-bearing surface 35a of the inner ring 8a without a spacer 18 (refer to FIG. 13). As a result, the reaction force that acts on the transmission gear 16 is supported using the seal ring-equipped ball bearing 1a, and the transmission gear 16 is positioned in the axial direction.

In this example, in the cross-sectional shape on the virtual plane that includes the center axis of the seal ring 4a, the angle $\alpha_1$ between the center axis of the seal ring 4a and extended line from the inside-continuous surface 29 is taken to be 104 degrees or greater ($\alpha_1 \geq 104°$). For example, in the seal ring 4b having the reference construction illustrated in FIG. 2B, the angle $\alpha_{1a}$ with respect to the inside-continuous surface 29a of the seal lip 14b is about 90 degrees ($\alpha_{1a} \approx 90°$), however, in this example, the inside-continuous surface 29 is inclined in a direction toward the center side in the axial direction of the seal ring-equipped ball bearing 1a going toward the inside in the radial direction. In this example, by making the lower limit value of the angle $\alpha_1$ equal to or greater than 104°, the base-end section of the inner-diameter-side inclined section 26 (right end in FIG. 2) is arranged further toward the center side in the axial direction of the seal ring-equipped ball bearing 1a than the base-end section of the inner-diameter-side inclined section 26a of the reference construction.

Figure 3:
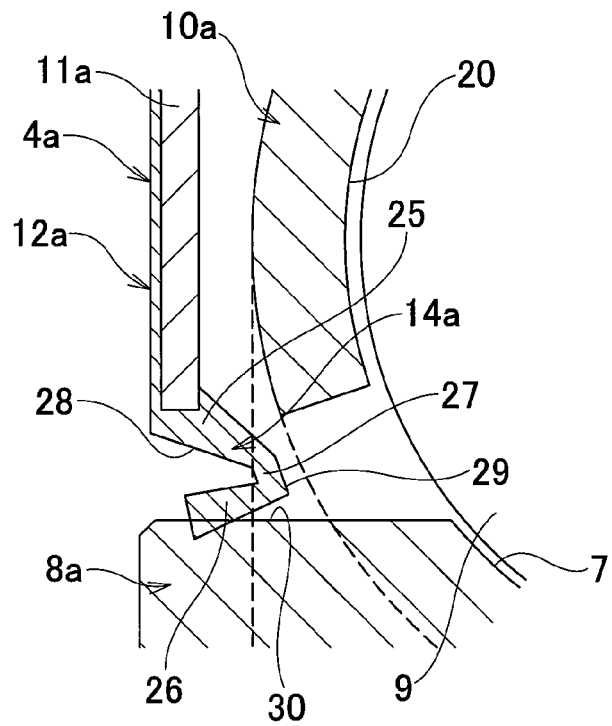
FIG. 3 is an enlarged cross-sectional view of part X in FIG. 1.
Figure 4:
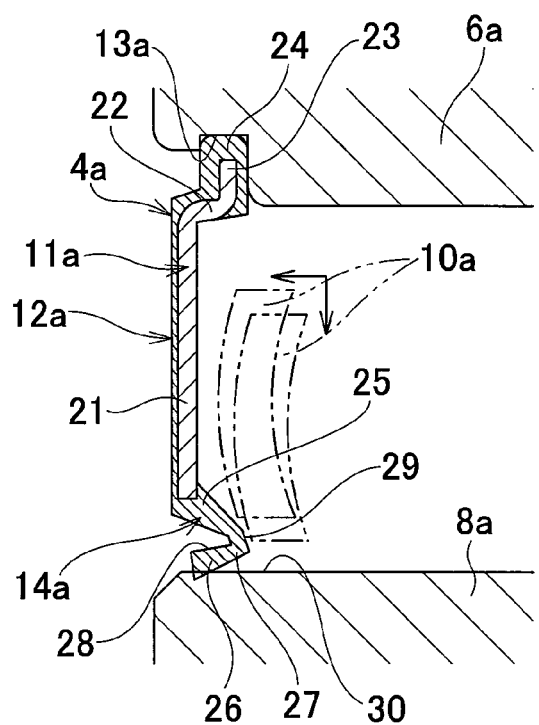
FIG. 4 is a partial cross-sectional view of a seal ring-equipped ball bearing, and is for explaining change in the positional relationship between the retainer and a seal lip as the retainer oscillates.
Figure 5:
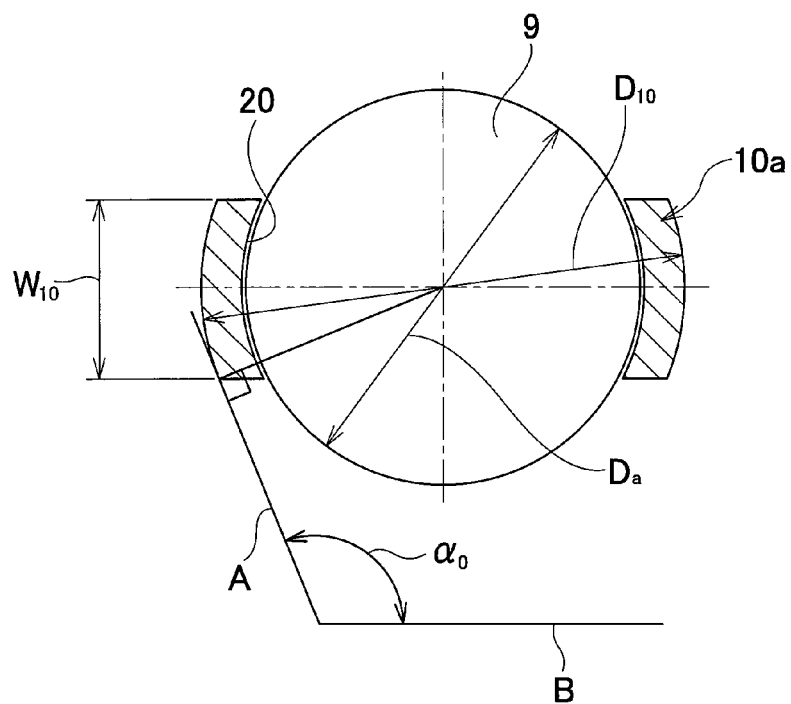
FIG. 5 is a partial cross-sectional view of a retainer that holds balls inside pockets, and is for explaining restrictions on the angle with respect to the inside-continuous surface of the seal lip.

The reason that the lower limit of the angle $\alpha_1$ was set to 104° will be explained with reference to FIG. 5. In the wave-shaped retainer 10a that is assembled in the seal ring-equipped ball bearing 1a of this example, the outer surface of a portion that corresponds to a pocket 20 is a partial spherical convex shape. Generally, the width dimension $W_{10}$ in the radial direction of the retainer 10a is about 0.4 to 0.5 times the diameter Da of the ball 9 that is held in the pocket 20 {$W_{10} = (0.4 \text{ to } 0.5) \text{ Da}$}. Moreover, the diameter $D_{10}$ of the partial spherical convex surface is about 1.6 to 1.63 times the diameter Da of the ball 9 {$D_{10}$=(1.6 to 1.63) Da}. Under such conditions, the angle $\alpha_0$ between the tangent line A that is tangent to the outer surface on the inner-diameter-side end section (inner-circumferential edge section) of the portion that corresponds to the pocket and a straight line B that is parallel to the center axis {$\alpha_0$=90°+ $\sin^{-1}$ ($W_{10}/D_{10}$)} is approximately 104°. By making the angle $\alpha_1$ with respect to the inside-continuous surface 29 equal to or greater than the angle $\alpha_0$ with respect to the tangent line A of the inner-circumferential edge section of the outer surface of the portion that corresponds to the pocket 20 of the retainer 10*a* ($\alpha_1 \geq \alpha_0$), and making the connecting section between the continuous section 27 and the inner-diameter-side inclined section 26 sharp to a certain extent, it is possible to maintain a state in which the inside-continuous surface 29 of the continuous section 27 enters into the portion that exists on the inner-diameter side of the convex surface of the retainer 10*a* as illustrated in FIG. 3, while effectively avoiding interference with the retainer regardless of the whirling of the retainer 10*a* such as illustrated in FIG. 4, due to the pocket space that exists between the inside surface of the pocket 20 and the rolling surface of the ball 9.

It is possible to increase the overall length (length in the axial direction) $L_{26}$ of the inner-diameter-side inclined section 26 by the amount that the inside-continuous surface 29 is made to enter into the portion that exists on the inner-diameter side of the convex surface of the retainer 10*a*, so as to lower the rigidity of the inner-diameter-side inclined section 26, and lower the friction resistance of the sliding area between the inner-circumferential edge section of the inner-diameter-side inclined section 26 and the outer-circumferential surface of the end section in the axial direction of the inner ring 8*a*. The upper limit of the angle $\alpha_1$ is restricted from the aspect of preventing the axial dimension of the seal lip 14*a* from becoming too long. Increasing the angle $\alpha_1$ beyond the inclination angle of the outer-circumferential surface of the outer-diameter-side inclined section 25 is meaningless, and the inclination angle of the outer-circumferential surface of the outer-diameter-side inclined section 25 is necessary to a certain extent in order to keep the necessary minimum rigidity of the outer-diameter-side inclined section 25. Taking the above into consideration, the upper limit value of the angle $\alpha_1$ is preferably about 150°.

In this example, the opening of the groove section 28 inclines just a little toward the outside in the radial direction. In other words, the groove section 28 has a wedge-shaped cross-sectional shape of which the width dimension in the radial direction becomes wider going toward the outside in the axial direction (toward the opening), and the bisector C of both the inside and outside surfaces in the radial direction of the groove section 28 is inclined in a direction toward the outside in the radial direction going toward the outside in the axial direction (left side in FIG. 2) of the seal ring-equipped ball bearing 1*a*. The intersection angle $\theta$ between the bisector C and straight line B is greater than 0° but no greater than 30° (0°≤$\theta$≤30°), preferably is equal to or greater than 5°, and the intersection angle $\theta$ including the upper limit value is regulated by the relationship with the inclination angle $\gamma$ of the inner-circumferential surface of the inner-diameter-side inclined section 26 that will be described later. In other words, the intersection angle $\theta$ is regulated within the range 5° to 10° in order to regulate the inclination angle $\gamma$ of the inner-circumferential surface of the inner-diameter-side inclined section 26 within a proper range.

In the reference construction illustrated in FIG. 2B, the intersection angle $\theta_a$ between the bisector C with respect to the groove section 28*a* and the straight line B that is parallel to the center axis is about 0° ($\theta_a$≈0°). Therefore, it is not possible to make the overall length $L_{26a}$ of the inner-diameter-side inclined section 26*a* as long as that of this example. In this example, the angle $\alpha_1$ with respect to the inside-continuous surface 29 is set to 104° or greater and the intersection angle $\theta$ is regulated within the above range, and thus it is possible to make the overall length $L_{26}$ of the inner-diameter-side inclined section 26 nearly 20% longer than that of the reference construction ($L_{26}$≈1.2 $L_{26a}$). This value is achieved in a case that, in a typical ball bearing provided with seal rings, the gap between the retainer 10*a* and the seal ring 4*a* is made as small as possible (within a range where the interference between the retainer 10*a* and the seal ring 4*a* can be prevented). Moreover, the angle $\alpha_1$ with respect to the inside-continuous surface 29 is smaller than the inclination angle $\alpha_2$ with respect to the outer-circumferential surface of the outer-diameter-side inclined section 25 ($\alpha_1 < \alpha_2$). Also, the thickness of the continuous section 27 with which the outer-diameter-side inclined section 25 and the inner-diameter-side inclined section 26 are connected is not always fixed in the radial direction, however, the angle $\alpha_1$ with respect to the inside-continuous surface 29 is regulated only based on the angle of the inside-continuous surface 29 which is a surface on the inside in the axial direction of the continuous section 27.

In the cross-sectional shape on a virtual plane that includes the center axis of the seal ring 4*a*, the inclination angle $\gamma$ of the inner-circumferential surface of the inner-diameter-side inclined section 26, or in other words, the intersection angle $\gamma$ between the inner-circumferential surface of the inner-diameter-side inclined section 26 and the straight line B that is parallel to the center axis is 15° to 25°. When the inclination angle $\gamma$ of the inner-circumferential surface of the inner-diameter-side inclined section 26 is greater than 25°, the rigidity (radial rigidity) in the radial direction of the inner-diameter-side inclined section 26 increases. As a result, when the distance between the inner-circumferential edge of the metal insert 11*a* and the outer-circumferential surface of the inner ring 8*a* changes, the ability to follow that change worsens, and deformation that occurs in the inner-diameter-side inclined section 26 becomes large. On the other hand, when the inclination angle $\gamma$ is less than 15°, the radial rigidity of the inner-diameter-side inclined section 26 becomes too low, and when the inner-circumferential edge of the metal insert 11*a* comes close to the outer-circumferential surface of the inner ring 8*a*, so-called abutting occurs in which the outer-circumferential surface of the inner ring 8*a* and the inner-circumferential surface of the inner-diameter-side inclined section 26 come in contact over an excessively large area, and the friction that acts on the area of sliding contact between these circumferential surfaces increases. On the other hand, when the inclination angle $\gamma$ of the inner-circumferential surface of the inner-diameter-side inclined section 26 is regulated to be within the range 15° to 25°, as long as the seal ring 4*a* is used in a state that the interference of the seal lip 14*a* is a typical value within the range of 0% to 1% of the inner diameter of the seal lip 14*a*, it is possible to keep the deformation and friction resistance of the inner-diameter-side inclined section 26 low. An interference of 0% is the state in which the outer diameter of the inner ring 8*a* and the inner diameter in the free state of the seal lip 14*a* are exactly the same. Moreover, when the width dimension of the seal ring-equipped ball bearing 1*a* is small (when it is necessary to make the width dimension of the seal ring 4*a* small), the intersection angle $\gamma$ between the inner-circumferential surface of the inner-diameter-side inclined section 26 and the straight line B that is parallel with the center line can be made to be 15° to 45° so that the rigidity in the radial direction of the inner-diameter-side inclined section 26 is maintained to a certain extent.

With the seal ring-equipped ball bearing 1a of this example, it is possible to increase the outer-diameter dimension of the load-bearing surface 35a, so together with being able to keep the contact surface area between the load-bearing surface 35a and the one end surface in the axial direction of the transmission gear 16 large, it is possible to reduce the dynamic torque. In other words, in this example, seal construction (shaft-seal construction) in which the inner-circumferential edge section of the inner-diameter-side inclined section 26, which is the tip-end edge of the seal lip 14a, is brought into sliding contact with the cylindrical surface 30, which is the outer-circumferential surface of the end section in the axial direction of the inner ring 8a. Therefore, it is possible to keep the outer-diameter dimension of the flat load-bearing surface 35a that is provided on one end surface in the axial direction of the inner ring 8a large without increasing the size of the seal ring-equipped ball bearing 1a. Therefore, it is possible for one end surface in the axial direction of the boss section 19 of the transmission gear 16 to come in direct contact with the load-bearing surface 35a of the inner ring 8a while maintaining a large contact surface area without having to provide a spacer 18 (see FIG. 13) between the seal ring-equipped ball bearing 1a of this example and the transmission gear 16. In this way, it is possible to eliminate the spacer 18 that was required in the conventional construction without having to increase the size of the seal ring-equipped ball bearing 1a, it is possible to reduce the number of parts of the automobile transmission and assembly steps for assembling the automobile transmission, and it is possible to make that automobile transmission more compact and lightweight.

In this example, the cross-sectional shape of the seal lip 14a is a substantially horizontal V shape and is regulated so that the inclination angle $\alpha_1$ of the inside-continuous surface 29 is 104° or greater along the movement track (area) of the retainer 10a due to whirling. Therefore, it is possible to move the continuous section 27 of the seal lip 14a inward in the radial direction of the retainer 10a while effectively avoiding interference with the retainer 10a. Therefore, by keeping the overall length of the inner-diameter-side inclined section 26 of the seal lip 14a long, and keeping the surface pressure at the area of sliding contact between the tip-end edge of the seal lip 14a and the outer-circumferential surface of the end section in the axial direction of the inner ring 8a (cylindrical surface 30) low, it is possible to reduce the dynamic torque of the seal ring-equipped ball bearing 1a. More specifically, in this example, when compared with the reference construction, the overall length $L_{26}$ of the inner-diameter-side inclined section 26 is nearly 20% longer, so it is possible to reduce the dynamic torque about 30%. The other construction, functions and effects are the same as those of the conventional construction.

Second to Fourth Examples

Figure 6:
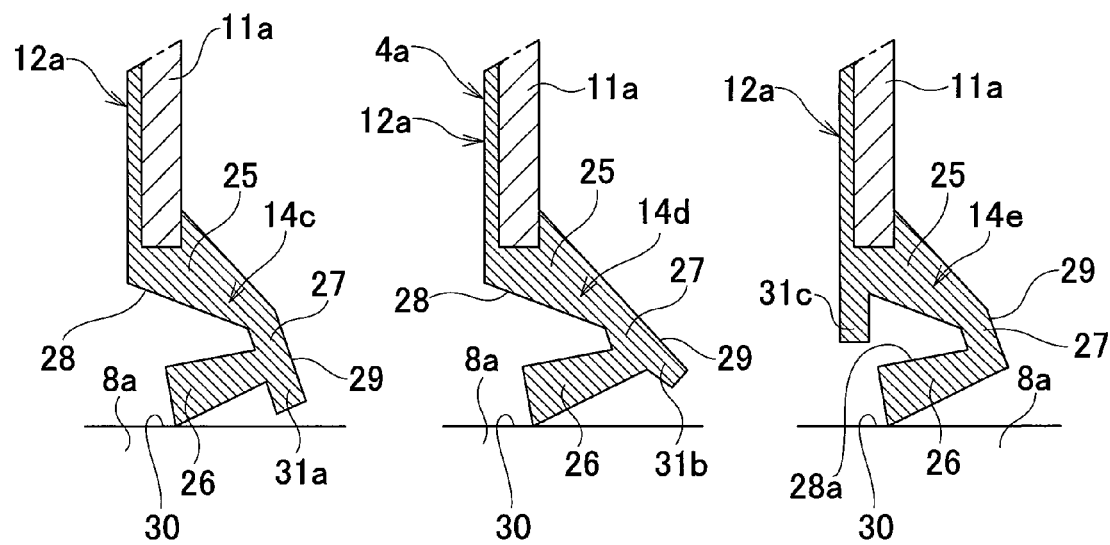
FIG. 6A to FIG. 6C are cross-sectional views similar to FIG. 2, and illustrate second to fourth examples of an embodiment of the present invention.

FIG. 6A to FIG. 6C illustrate second to fourth examples of an embodiment of the present invention. In these examples, in the range in which it is possible to maintain the overall lengths of the seal lips 14c to 14e, sub seal lips 31a to 31c are provided around the entire circumferences of part of the seal lips 14c to 14e. The shapes, dimensions and installation positions of these sub seal lips 31a to 31c are suitably regulated from the aspect of improving the sealing characteristics of the seal lips 14c to 14e. The sub seal lips 31a, 31b that are illustrated in FIG. 6A and FIG. 6B are shaped so as to extend inward in the radial direction of the continuous section 27, and the tip-end edge is made to closely face the outer-circumferential surface in the axial direction of the inner ring 8a (cylindrical surface 30) to form a labyrinth seal in that portion. The sub seal lip 31c illustrated in FIG. 6C protrudes inward in the radial direction from a portion located on the inside of the inner-circumferential edge of the metal insert 11a, and covers part of the opening of the groove section 28a. The other construction and functions are the same as those of the first example of an embodiment.

Fifth and Sixth Examples

Figure 7:
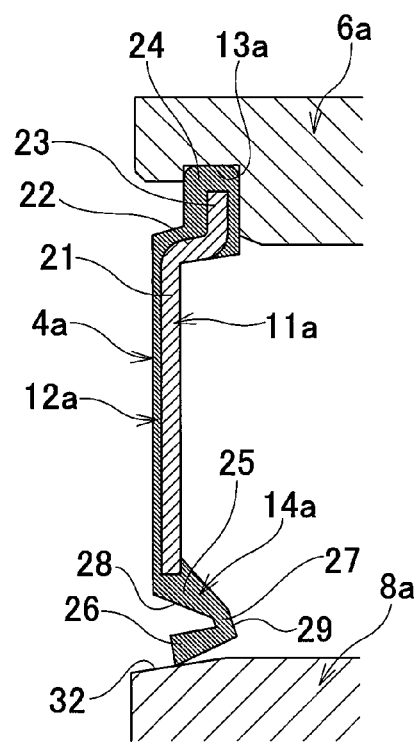
FIG. 7A and FIG. 7B are partial cross-sectional views of a seal ring-equipped ball bearing, and illustrate fifth and sixth examples of an embodiment of the present invention.
Figure 7:
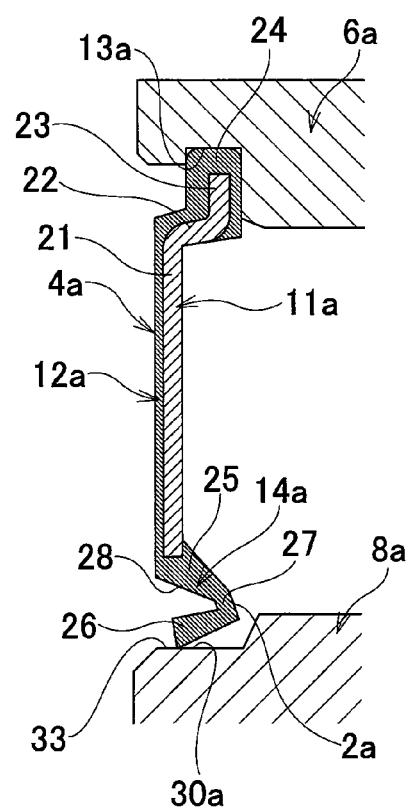

FIG. 7A and FIG. 7B illustrate fifth and sixth examples of an embodiment of the present invention. In these examples, the shape of the portion on the outer-circumferential surface in the axial direction of the inner ring 8a that the tip-end edge of the seal lip 14a comes in contact with is different than in the first example of an embodiment. In the fifth example illustrated in FIG. 7A, a partial conical convex inclined surface is formed on the outer-circumferential surface of the end section in the axial direction of the inner ring 8a, and the tip-end edge (inner-circumferential edge section of the inner-diameter-side inclined section 26) of the seal lip 14a comes in contact around the entire circumference of the inclined surface 32. In this kind of construction, angle γ and angle θ that were explained using FIG. 2A are angles formed between the generating line of the inclined surface 32 and the inner-circumferential surface of the inner-diameter-side inclined section 26 or bisector line of the groove section 28. In the sixth example illustrated in FIG. 7B, a small-diameter stepped section 33 is formed around the outer-circumferential surface on the end section in the axial direction of the inner ring 8a, and the tip-end edge of the seal lip 14a is made to come in sliding contact around the entire circumferential surface of the cylindrical surface 30a, which is the outer-circumferential surface of the small-diameter stepped section 33. In these types of construction, when compared with the first example of an embodiment, the outer-diameter dimension of the load-bearing surface of the inner ring 8a is smaller, however, when compared with the conventional construction can be made sufficiently large. The other construction and functions are the same as those of the first example of an embodiment.

Seventh and Eighth Examples

Figure 8:
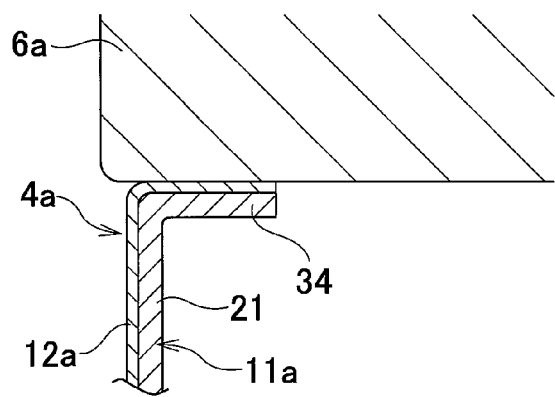
FIG. 8A and FIG. 8B are partial cross-sectional views of a seal ring-equipped ball bearing, and illustrate seventh and eighth examples of an embodiment of the present invention.
Figure 8:
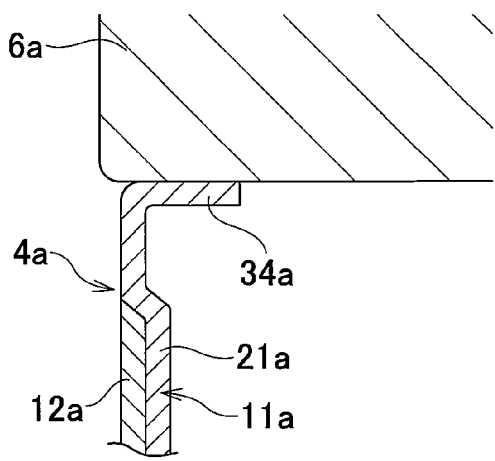

FIG. 8A and FIG. 8B illustrate seventh and eighth examples of an embodiment of the present invention. In these examples, the locking construction for locking the seal ring 4a to the inner-circumferential surface in the axial direction of the outer ring 6a is devised. More specifically, in the construction illustrated in FIG. 8A, the inner-circumferential surface of the end section in the axial direction of the outer ring 6a is a simple cylindrical surface with no locking groove provided. A fitting cylindrical section 34 that is bent at nearly a right angle toward the center side in the axial direction (right side in FIG. 8A) of the seal ring-equipped ball bearing 1a from the outer-circumferential edge of the annular section 21 of the metal insert 11a is fastened around the inside of this kind of inner-circumferential surface on the end section in the axial direction of the outer ring 6a by way of an elastic member 12a. In the construction illustrated in FIG. 8B as well, the inner-circumferential surface on the end section in the axial direction of the outer ring 6a is a simple cylindrical surface, and a fitting cylindrical section 34a that is bent at nearly a right angel toward the center side in the axial direction (right side in FIG. 8B) of the seal ring-equipped ball bearing 1a from the outer-circumferential edge of the annular section 21a of the metal insert 11a is directly fastened around the inside of this kind of inner-circumferential surface on the end section in the axial direction of the outer ring 6a. In these types of construction, there is no need to form a locking groove around the inner-circumferential surface of the end section in the axial direction of the outer ring 6a, so it is possible to reduce processing cost. The other construction and functions are the same as those of the first example of an embodiment.

Ninth Example

FIG. 9 to FIG. 12 illustrates a ninth example of an embodiment of the present invention. In this example, the relationship between the thickness dimension and length dimension of the continuous section 27a of the seal lip 14f is regulated in order to keep the tension force of the seal lip 14f that is provided around the inner-circumferential edge section of the seal ring 4a small. In other words, in this example, the length dimension $L_{36}$ of the fixed-thickness portion 36 of the continuous section 27a that has a fixed thickness dimension is regulated to be within the range of 1 to 2 times the thickness dimension $H_{36}$ of the fixed-thickness portion 36 (1.6 times in the example in the figure) ($1H_{36} \leq L_{36} \leq 2H_{36}$).

When the length dimension $L_{36}$ of the fixed-thickness portion 36 is less than the thickness dimension $H_{36}$ ($L_{36} < 1H_{36}$), it becomes difficult to bend the fixed-thickness portion 36, so the tension force of the inner-circumferential edge section of the seal lip 14f with respect to the cylindrical surface 30 of the inner ring 8a becomes high. Therefore, when the interference S that is typically applied to the seal lips of a seal ring-equipped ball bearing that is assembled in an automobile transmission is set, the movement of the seal lip 14f is unstable and it becomes difficult to maintain sufficient seal performance. Here, the size of the interference that is typically applied to the seal lips of a seal ring-equipped ball bearing of an automatic transmission is the size of interference that is required when taking into consideration the tolerance of the inner-diameter dimension of the seal lip 14f, the tolerance of the outer-diameter dimension of the cylindrical surface 30 of the inner ring 8a, and the relative displacement between the inner and outer rings in the radial direction due to loading and radial gaps.

Figure 10:
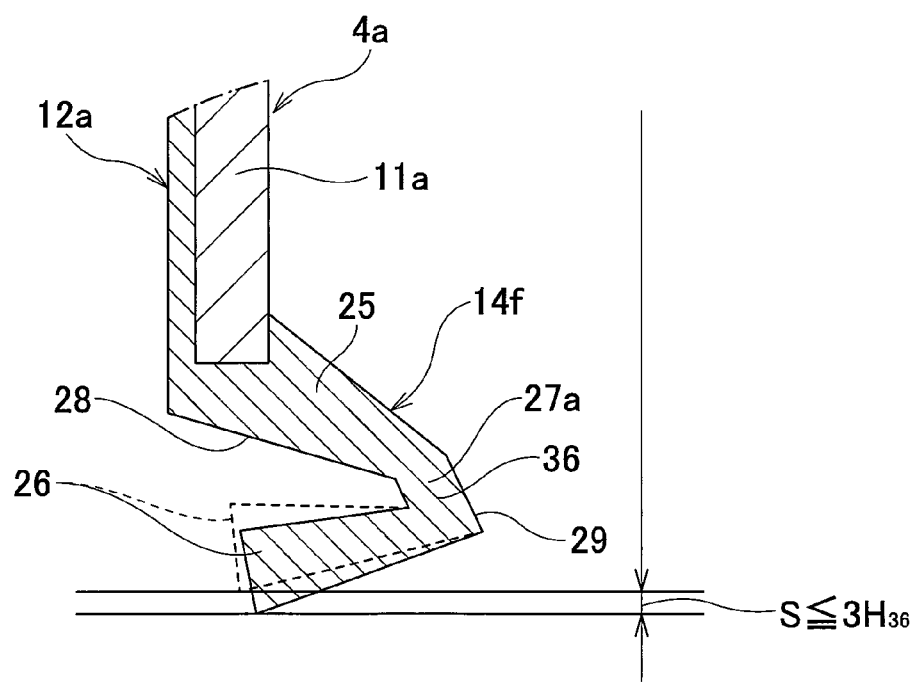
FIG. 10 is a cross-sectional view similar to FIG. 2, and illustrates the relationship between the interference and the thickness dimension of a portion with fixed thickness.

In the seal ring-equipped ball bearing 1a of this example, the upper-limit value of the interference S, as illustrated in FIG. 10, is preferably set to 3 times or less the thickness dimension $H_{36}$ of the fixed-thickness portion ($S \leq 3H_{36}$). When the value of the interference S is larger than 3 times the thickness dimension $H_{36}$ of the fixed-thickness portion 36, it becomes difficult to absorb displacement in the radial direction by just deformation of the inner-diameter-side inclined section 26. As a result, problems such as the inner-circumferential surface of the inner-diameter-side inclined section 26 abutting against the cylindrical surface 30 of the inner ring 8a, an increase in tension force, and interference with the retainer 10a occur easily. Taking into consideration the size of a bearing used in an automobile transmission that is assembled in a normal automobile, the size of the thickness dimension $H_{36}$ of the fixed-thickness portion 36 is within the range 200 μm to 400 μm. When less than 200 μm, the fixed-thickness portion 36 becomes too thin, and it becomes easy for defects such as cracking to occur when manufacturing the seal ring 4a, and when greater than 400 μm, the thickness of the seal lips with respect to the bearing size becomes too large, and the torque performance decreases.

On the other hand, when the length dimension $L_{36}$ of the fixed-thickness portion 36 becomes greater than 2 times the thickness dimension $H_{36}$ ($L_{36} > 2H_{36}$), displacement in the axial direction of the seal lip 14f (particularly the inner-diameter-side inclined section 26) becomes large. Therefore, in cases where the design space (design area) for the seal lip 14f is limited such as when the distance from the inner-circumferential edge section of the seal lip 14f to the end surface in the axial direction of the inner ring 8a is short, or the seal lip 14f and retainer 10a (see FIG. 1) are close, there is a high possibility that the inner-circumferential edge section (portion of sliding contact) of the seal lip 14f will separate in the axial direction of the cylindrical surface 30, or part of the seal lip 14f will interfere with the retainer 10a.

Figure 11:
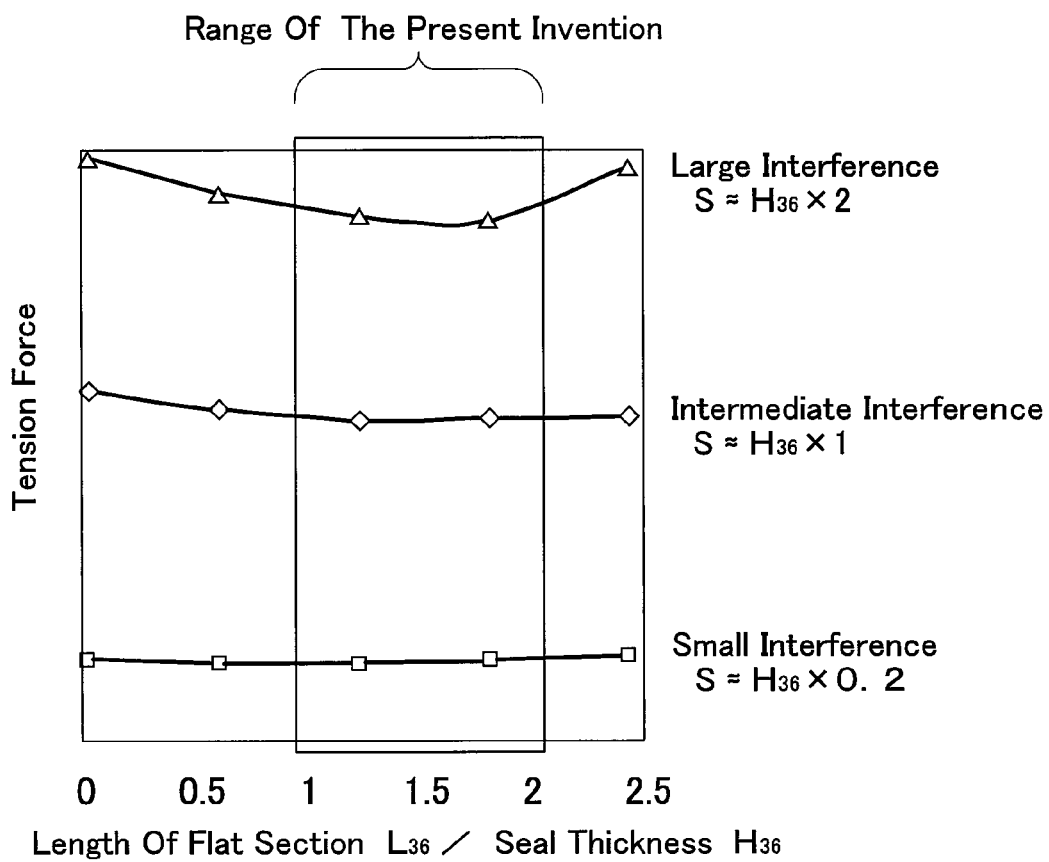
FIG. 11 is a graph illustrating the results of testing that was performed in order to confirm the effect of the relationship between the thickness dimension and length dimension of the portion with fixed thickness on the tension force of the seal lip.
Figure 12:
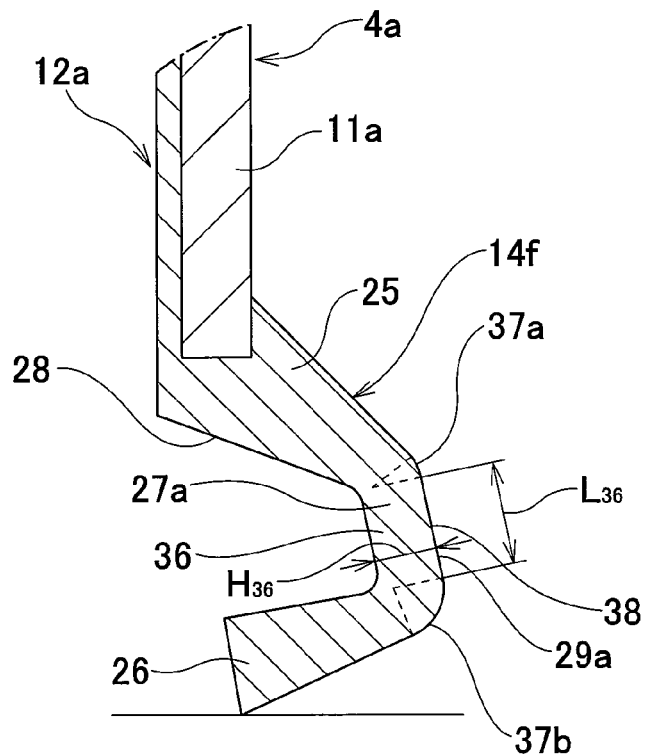
FIG. 12A and FIG. 12B are cross-sectional views similar to FIG. 2, and illustrate two other examples of the object of the present invention.
Figure 12:
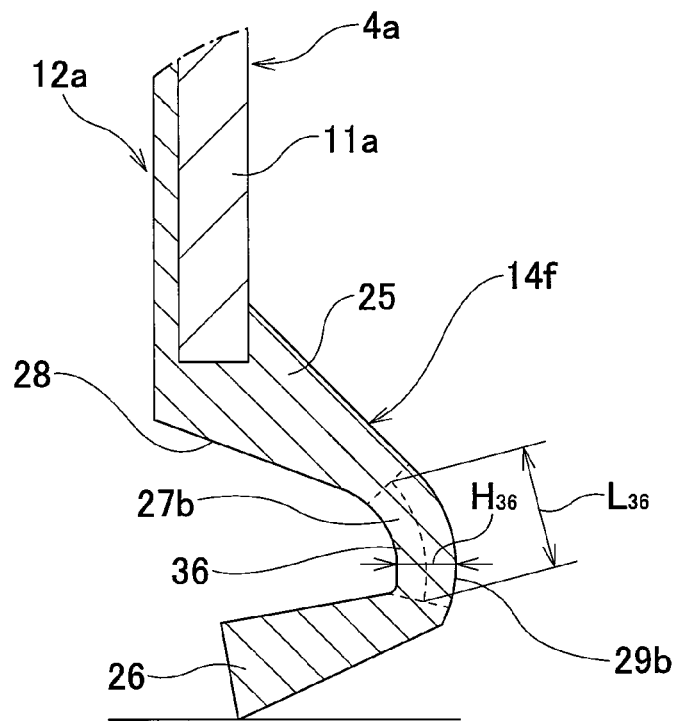

FIG. 11 illustrates test results when investigating the effect that the relationship between the length dimension $L_{36}$ and thickness dimension $H_{36}$ of the fixed-thickness portion 36 ($L_{36}/H_{36}$) has on the tension force of the seal lip for three seal rings having different sizes of interference S. As can be clearly seen from the test results, when the size of the interference S was set to be "Small ($S \approx H_{36} \times 0.2$)", or "Intermediate ($S \approx H_{36} \times 1$)", it was confirmed that the size of the tension force did not change so much, even when the relationship between the length dimension $L_{36}$ and thickness dimension $H_{36}$ of the fixed-thickness portion was changed. However, when the size of the interference was set to "Large ($S \approx H_{36} \times 2$)", it was confirmed that the value of the tension force became small when the relationship between the length dimension $L_{36}$ and thickness dimension $H_{36}$ of the fixed-thickness portion was within a range that satisfied the relationship $1H_{36} \leq L_{36} \leq 2H_{36}$, and the value of the tension force became larger the more the relationship became separated from of this range (larger or smaller). Therefore, in the case of this example of a seal ring-equipped ball bearing 1a of a rotation support section of an automobile transmission, by regulating the relationship between the length dimension $L_{36}$ and thickness dimension $H_{36}$ of the fixed-thickness portion so as to satisfy the relationship $1H_{36} \leq L_{36} \leq 2H_{36}$, it was confirmed that the tension force of the seal lip 14f was kept low regardless of the size of the interference S.

In the seal ring-equipped ball bearing 1a of this example, when an automobile transmission is an object for installation thereof, it is necessary to set the size of the interference S to be large as related to the thickness dimension $H_{36}$ of the fixed-thickness portion ($1H_{36} < S_{36} \leq 3H_{36}$), so by regulating the length dimension $L_{36}$ of the fixed-thickness portion 36 to be within the range 1 to 2 times the thickness dimension $H_{36}$, it is possible to keep the tension force of the seal lip 14f small. Moreover, in this example, it is possible to prevent part of the seal lip 14f from interfering with the retainer 10a, and prevent the inner-circumferential edge section, which is the area of sliding contact, from separating in the axial direction from the cylindrical surface 30.

Figure 9:
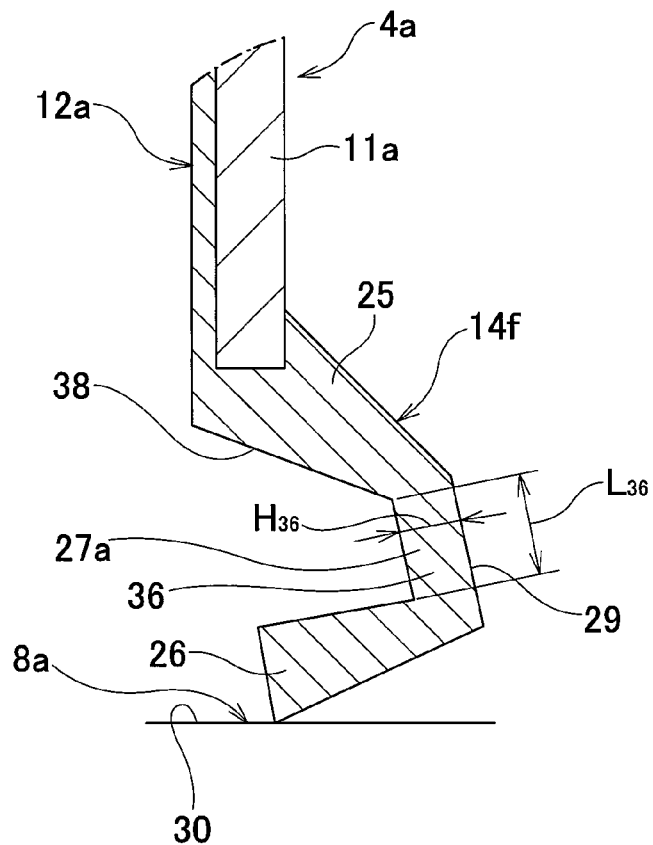
FIG. 9 is a cross-sectional view similar to FIG. 2, and illustrates a ninth example of an embodiment of the present invention.

Construction that regulates the relationship between the length dimension $L_{36}$ and the thickness dimension $H_{36}$ of the fixed-thickness portion 36 in order to lower the tension force, is not limited to construction in which the entire continuous section 27a (inside-continuous surface 29) that includes the fixed-thickness portion 36 is straight as was illustrated in FIG. 9. When the seal ring 4a is made by metal molding, the continuous portion between the outer-circumferential surface of the outer-diameter-side inclined section 25 and the inside-continuous surface 29, and the continuous portion between the inner-circumferential surface of the inner-diameter-side inclined section 26 and the inside-continuous surface 29 are seldom a linear angle section, and as illustrated in FIG. 12A, often circular arc sections 37a, 37b having a radius of curvature of about 0.1 mm are formed in the continuous portion between the outer-circumferential surface of the outer-diameter-side inclined section 25 and the inside-continuous surface 29, and the continuous portion between the inner-circumferential surface of the inner-diameter-side inclined section 26 and the inside-continuous surface 29. In the case of this kind of construction, the overall length of the straight section 38 that excludes the circular arc sections 37a, 37b is taken to be the length dimension $L_{36}$ of the fixed-thickness portion 36, and the relationship with the thickness dimension $H_{36}$ is regulated. As illustrated in FIG. 12B, in the case of construction in which the entire continuous section 27b is bent into a circular arc shape, the length dimension of the circular arc shape section (distance between both ends of the fixed-thickness portion 36) is taken to be the length dimension $L_{36}$ of the fixed portion 36, and the relationship with the thickness dimension $H_{36}$ is regulated. In the construction illustrated in FIG. 12B, the angle condition of the present invention is satisfied as long as the angle between the tangent line that passes through at least part of the portion of the inside-continuous surface 29b that corresponds with the fixed-thickness portion 36 and the center axis of the seal ring 4a is 104° or greater. Moreover, it is not illustrated in the figures, however, the angle condition of the present invention is satisfied when the angle between the tangent line that passes through at least part of the portion of the inside-continuous surface that corresponds with the fixed-thickness portion and the center axis of the seal ring is 104° or greater, even in the case of construction in which the continuous section includes a circular arc shaped fixed-thickness portion and a circular arc shaped varying-thickness portion. The other construction, functions and effects are the same as those of the first example of an embodiment.

An automobile transmission in which the seal ring-equipped ball bearing of the present invention is assembled is not limited to the construction illustrated in the figures, and it is possible to use an automobile transmission of various kinds of construction. For example, construction is not limited to construction in which a transmission gear that is arranged adjacent in the axial direction to the seal ring-equipped ball bearing is supported by the rotating shaft by way of a radial needle bearing so as to rotate freely, and it is also possible to use other construction in which the transmission gear is supported so that relative rotation is not possible. The member that is arranged adjacent in the axial direction to the seal ring-equipped ball bearing of the present invention is not limited to a transmission gear. The retainer that is assembled in the seal ring-equipped ball bearing of the present invention is not limited to a metal wave-shaped retainer as explained in each of the examples of an embodiment of the present invention, and it is also possible to use a synthetic resin retainer. As this synthetic resin retainer, it is possible to use a retainer that is produced by forming a resin composition in which a fiber shaped reinforcing material such as glass fiber, carbon fiber, aramid fiber or the like is mixed with a polyamide, polyphenylene sulfide (PPS), polyimide, polyether ether ketone (PEEK) or the like into a specified shape (for example a crown cage shape that has a ring-shaped based section and plural column sections). When a synthetic resin crown cage retainer is used, it is possible to form notches in the portions that are located on the outside in the radial direction of the continuous section of the seal lip (inner-circumferential edge section of the base section), or it is also possible to offset the position where the balls are located (position where the outer-ring raceway and inner-ring raceway are formed) in the axial direction, and make the dimension in the axial direction (width dimension) of the seal ring-equipped ball bearing small. Furthermore, the construction of the examples of embodiments described above can be appropriately combined.

INDUSTRIAL APPLICATION

The seal ring-equipped ball bearing of the present invention can be widely applied in automobile transmissions having various kinds of construction such as a manual transmission (MT), a dual-clutch transmission (DCT), a planetary-gear type transmission, a belt transmission, a toroidal transmission and the like.

EXPLANATION OF REFERENCE NUMBERS 1, 1a Seal ring-equipped ball bearing
2 Rotating shaft
3, 3a Ball bearing
4, 4a, 4b Seal ring
5 Outer-ring raceway
6, 6a Outer ring
7 Inner-ring raceway
8, 8a Inner ring
9 Ball
10, 10a Retainer
11, 11a Metal insert
12, 12a Elastic member
13, 13a Locking groove
14, 14a to 14f Seal lip
15 Seal groove
16 Transmission gear
17 Radial needle bearing
18 Spacer
19 Support cylinder (Boss)
20 Pocket
21 Annular section
22 Cylindrical section
23 Bent section
24 Ring-shaped locking section
25 Outer-diameter-side inclined section
26, 26a Inner-diameter-side inclined section
27 Continuous section
28, 28a Groove section
29, 29a, 29b Inside-continuous surface
30, 30a Cylindrical surface
31a to 31c Sub seal lip
32 Inclined surface
33 Small-diameter stepped section
34, 34a Fitting cylindrical section
35, 35a Load-bearing surface
36 Fixed-thickness portion
37a, 37b Circular arc section
38 Straight section

What is claimed is:
1. A seal ring-equipped ball bearing for assembly in a rotation-support section of an automobile transmission, comprising:
an outer ring that has an outer-ring raceway around an inner-circumferential surface, and that does not rotate during use;

an inner ring that has an inner-ring raceway around an outer-circumferential surface, and that rotates during use;

plural balls that are arranged between the outer-ring raceway and the inner-ring raceway so as to roll freely;

a retainer holding the plural balls so as to roll freely; and a seal ring that is fastened around the inner-circumferential surface on an end section in an axial direction of the outer ring, and covers an opening on an end section in the axial direction of a ring-shaped internal space that exists between the inner-circumferential surface of the outer ring and the outer-circumferential surface of the inner ring where the balls are located;

wherein a load-bearing surface is provided on an end surface in the axial direction of the inner ring, to contact a member that is arranged adjacent in the axial direction when the seal ring-equipped ball bearing is assembled in the rotation-support section, and to support a load in the axial direction that acts from the member;

wherein the seal ring comprises:

an annular shaped metal insert; and an elastic member that is reinforced by the metal insert, and has a seal lip that is formed by protruding an entire inner-circumferential edge section of the elastic member further inward in a radial direction than the metal insert, and that is able to elastically deform in at least the radial direction; and wherein the seal lip comprises:

an outer-diameter-side inclined section that is inclined inward in the radial direction and in a direction toward a center side in the axial direction of the seal ring-equipped ball bearing going away from an inner-circumferential edge of the metal insert; and an inner-diameter-side inclined section that is inclined inward in the radial direction and in a direction toward an outside in the axial direction of the seal ring-equipped ball bearing going away from the outer-diameter-side inclined section; and a continuous section that makes a small-diameter side end section of the outer-diameter-side inclined section and a large-diameter-side end section of the inner-diameter-side inclined section continuous;

wherein a portion that is bounded by an inner-circumferential surface of the outer-diameter-side inclined section, an outer-circumferential surface of the inner-diameter-side inclined section, and an axial side surface in the axial direction of the continuous section is a groove section that has a wedge-shape cross section;

wherein a surface on an opposite side in the axial direction from the groove section is taken to be an inside-continuous surface; and wherein an inner-circumferential edge section of the inner-diameter-side inclined section, which is a tip-end edge of the seal lip, comes in sliding contact entirely around the outer-circumferential surface of the end section in the axial direction of the inner ring, and in a cross-sectional shape on a virtual plane that includes the center axis of the seal ring, an angle between the center axis and an extended line of the inside-continuous surface is 104° or greater but no greater than 150°;

a length dimension L of a fixed-thickness portion of the continuous section where a thickness dimension is fixed is regulated to be within the range of one to two times a thickness dimension H of the fixed-thickness portion;

the thickness dimension H of the fixed-thickness portion is 200 µm to 400 µm; and an interference S of the seal lip is 3 or less times the thickness dimension H of the fixed-thickness portion.

2. The seal ring-equipped ball bearing according to claim 1, wherein in the cross-sectional shape on the virtual plane, a bisector of inside surfaces of the groove section and the center axis cross on an internal-space side of the seal ring-equipped ball bearing.

3. The seal ring-equipped ball bearing according to claim 1, wherein the retainer is a wave-shaped retainer that is formed by connecting and fastening together with rivets a pair of retaining elements that are obtained by bending annular shaped metal plates in a pressing process so as to have a wave shape in the circumferential direction, with outside surfaces of the parts that correspond to the pockets that hold the balls being partial spherical convex surfaces.

4. A combination of a seal ring-equipped ball bearing according to claim 1 assembled in a rotation-support section of an automobile transmission, wherein the member arranged adjacent to the load-bearing surface in the axial direction is a transmission gear.

5. The combination of claim 4, wherein in the cross-sectional shape on the virtual plane, a bisector of inside surfaces of the groove section and the center axis cross on an internal-space side of the seal ring-equipped ball bearing.

6. The combination of claim 4, wherein the retainer is a wave-shaped retainer that is formed by connecting and fastening together with rivets a pair of retaining elements that are obtained by bending annular shaped metal plates in a pressing process so as to have a wave shape in the circumferential direction, with outside surfaces of the parts that correspond to the pockets that hold the balls being partial spherical convex surfaces.

* * * * *